Sept. 20, 1927.
C. R. TAYLOR
GRAIN DRILL ATTACHMENT
Filed March 10, 1924
1,642,908
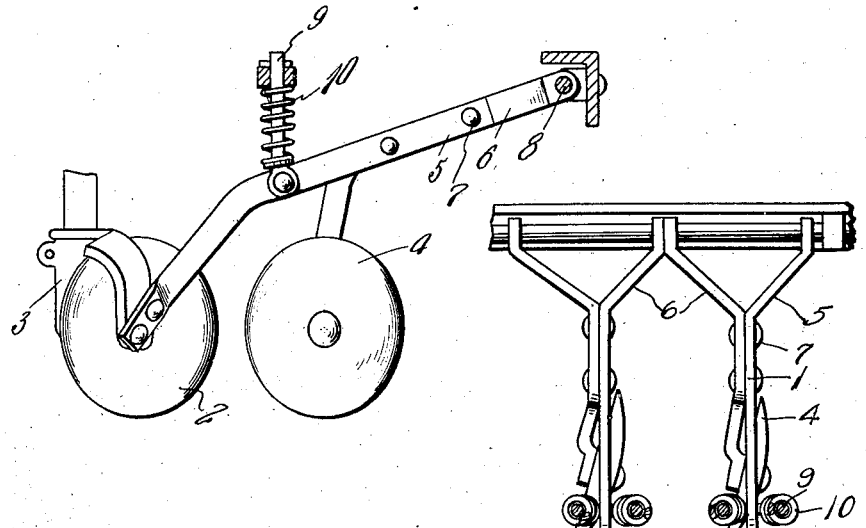
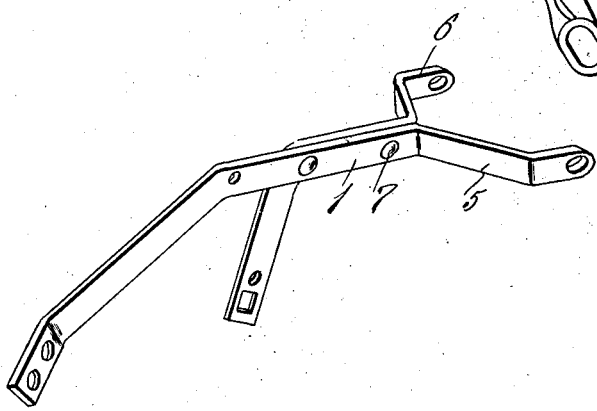
C. R. Taylor
INVENTOR
BY Victor J. Evans
ATTORNEY
WITNESS:

Patented Sept. 20, 1927.

1,642,908

UNITED STATES PATENT OFFICE.

CHARLES ROBERT TAYLOR, OF MOCCASIN, MONTANA.

GRAIN-DRILL ATTACHMENT.

Application filed March 10, 1924. Serial No. 698,246.

This invention relates to improvements in grain drills, the general object of the invention being to provide means for supporting an extra disc in front of each boot disc so as to make furrows for receiving the grain and provide ridges to hold snow to protect the grain and thus increase the yield per acre.

Another object of the invention is to provide means whereby the pairs of discs can be easily attached to drills as now manufactured.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary horizontal sectional view through a drill, showing the invention in use.

Figure 2 is a vertical sectional view through Figure 2, with parts in elevation.

Figure 3 is a perspective view of one of the supporting means.

As shown in these views, I provide a number of supporting members 1, each of which is arranged to support discs 2 with which the boot 3 is associated and an extra disc 4 which is arranged in front of the discs 2 and has its position reversed from that of the first disc so as to make a furrow to receive the grain falling from the boot and to leave a ridge which will act to hold snow and moisture and thus increase the yield from the field. Each member is composed of a pair of beams 5 and 6 which are fastened together by bolts 7 or the like and the front ends are inclined outwardly away from each other to produce a fork and the extremities of the beams are provided with holes for receiving a rod 8 which is suitably attached to the frame of the drill so that the members are pivoted to the frame so that they can swing about a horizontal axis. The rear ends of the beams are bent downwardly at an incline and are provided with openings for receiving the fastening means of the disc. Rods 9 are connected with the long beam of each member and pass through holes in a part of the frame and receive the springs 10 which act to press the disc into the ground.

From the foregoing it will be seen that the members can be easily and quickly attached to drills as now manufactured in place of the single beams now in use and that the members are held against play laterally by means of the forked portions engaging each other. The extra disc will form furrows for receiving the grain falling from the boots and ridges which will act to prevent blowing of the soil and hold snow and moisture and thus increase the yield.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a grain drill, a plurality of supporting members each including a pair of beams secured together, the front ends of said beams being inclined outwardly from each other to produce a fork with openings in the extremities of said beams, a supporting rod passed through the openings for pivotally mounting the said members, one of said beams being longer than the other and both having their rear ends bent downwardly at an incline and formed with openings, a disk attached to the extremities of the rear ends of the beams with one disk disposed at an angle directly opposite the angle of the other disk, a rod connected with the longer beam at a point adjacent its inclination, a coil spring mounted upon the rod and normally bearing against the beam.

In testimony whereof I affix my signature.

CHARLES ROBERT TAYLOR.